(12) United States Patent
DelVecchio et al.

(10) Patent No.: US 7,131,705 B1
(45) Date of Patent: Nov. 7, 2006

(54) WHEEL HUB COVER

(75) Inventors: Thomas L. DelVecchio, Middlebury, IN (US); Gary Adamson, Three Rivers, MI (US)

(73) Assignee: Dicor Corporation, Inc., Elkhart, IN (US)

( * ) Notice: Subject to any disclaimer, the term of this patent is extended or adjusted under 35 U.S.C. 154(b) by 36 days.

(21) Appl. No.: 10/839,746

(22) Filed: May 5, 2004

Related U.S. Application Data

(60) Provisional application No. 60/472,513, filed on May 22, 2003.

(51) Int. Cl.
*B06B 7/14* (2006.01)

(52) U.S. Cl. .............................. 301/37.372; 301/37.37; 301/37.373; 301/108.4; 301/108.1

(58) Field of Classification Search ........... 301/37.371, 301/37.372, 37.373, 108.4, 37.34, 37.35, 301/37.42, 37.21, 37.33, 37.36, 108.1, 111, 301/37.37, 373.29, 37.38, 37.374, 37.375, 301/37.376

See application file for complete search history.

(56) References Cited

U.S. PATENT DOCUMENTS

| | | | | |
|---|---|---|---|---|
| 3,202,460 A | * | 8/1965 | Holbrow | 301/37.376 |
| 4,217,003 A | * | 8/1980 | Main | 301/37.373 |
| 4,382,635 A | * | 5/1983 | Brown et al. | 301/37.35 |
| 5,249,845 A | * | 10/1993 | Dubost | 301/37.373 |
| 5,297,854 A | * | 3/1994 | Nielsen et al. | 301/37.373 |
| 5,494,336 A | * | 2/1996 | Russell | 301/37.372 |
| 5,853,228 A | * | 12/1998 | Patti et al. | 301/37.371 |
| 5,890,773 A | | 4/1999 | Wright | |
| 6,022,081 A | * | 2/2000 | Hauler et al. | 301/37.373 |
| 6,325,461 B1 | * | 12/2001 | Hauler | 301/37.372 |
| 6,682,151 B1 | * | 1/2004 | Van Houten et al. | 301/37.373 |

* cited by examiner

*Primary Examiner*—Frantz F. Jules
(74) *Attorney, Agent, or Firm*—Botkin & Hall, LLP

(57) ABSTRACT

A cover for a wheel or hub may be rotationally attached and removed from the hub by hand due to a mounting clip on the cover defining a space for a single lug nut and a tangentially oriented entryway.

4 Claims, 7 Drawing Sheets

WHEEL HUB COVER

CROSS-REFERENCE TO RELATED APPLICATION

This is a continuation of provisional application Ser. No. 60/472,513, filed May 22, 2003, and claims the priority thereof.

FIELD OF THE INVENTION

The invention disclosed herein relates to covers for wheel hubs or wheels such as decorative hub covers.

BACKGROUND OF THE INVENTION

Typically, the axle hub on a vehicle is exposed to view from the exterior of the vehicle. The appearance of this hub in some instances is not desirable due to its utilitarian design. The use of decorative hub covers recognizes the desire for an improved appearance of this area of the vehicle, typically regarded as the tire and wheel assembly. It is well known to cover the hub or exposed wheel of an automobile tire and wheel assembly with a decorative cover—or hub cap—to both improve the aesthetic impression of the vehicle and to reduce the amount of dirt and grime that comes into contact with the exposed lug nuts that hold the wheel to the axle hub.

The decorative hub covers must be removed from the wheel periodically in order to service the tire, wheel, brakes, hub, or axle. For example, in some assemblies where the axle hub has a grease fitting installed, the decorative hub cover must be removed to apply grease to the wheel bearing assembly as a matter of routine maintenance. In other vehicles, it is recommended that the torque value of the lug nuts be checked periodically to ensure proper, safe wheel mounting. Such periodic maintenance generally requires the hub cover to be removed from the wheel to perform the maintenance and then remounted to the wheel afterward.

Many typical known hub covers include a frictionally engaged, resilient locking system whereby the cover is snap-fitted to the hub by pressing the cover axially onto the wheel. One or more resilient engagement surfaces then snap into a groove or recess in the wheel to releasably lock the cover to the wheel. Most of these designs require the use of tools to some extent to either install or remove the decorative hub cover. Some decorative hub covers even take into account the needed tool by providing a slot in the cover so that the tool can be inserted into the slot to pry the cover from the tire and wheel assembly. Such a slot prevents the tool from damaging the finished surface of the decorative hub cover, which is often highly polished. This design, however, is problematic because the finished surface of the wheel itself or its decorative trim is usually damaged by the prying necessary to remove the hub cover.

Other such decorative hub cover designs leave it up to the individual to determine the best method of mounting and removal in order to minimize the damage to the surfaces of both the hub cover and the wheel. This does nothing to minimize the damage caused by applying tools to the surfaces of the decorative hub cover or the tire and wheel assembly.

Another known decorative hub cover design is described in U.S. Pat. No. 4,217,003 and obviates the need for using tools to attach and release the cover to the wheel by rotatingly engaging a plurality of open faced, single walled retention members about the wheel axis into engagement with the lug nuts. The plurality of retention members act together to maintain the cover on the wheel by collectively defining an intermittent ridge or surface about the exterior of all the lug nuts that fits into the radially distal portion of each of the grooves defined between the lug nuts and the wheel. A resilient camming surface in each of the retention members prevents the cover from unwanted rotational disengagement with lug nuts. This cover attachment design thereby allows the cover to be attached and released from the wheel by simply rotating the plurality of retention members about the lug nuts about the wheel's axis without the need for additional tools. A problem with this design, however, is that the retention members must act collectively to lock the cover to the lug nuts. If some of the retention members are broken, the remaining retention members may not be able to maintain the cover on the lug nuts.

Therefore, it would be desirable to have a cover for a wheel or hub that may be attached and released to the lug nuts without requiring the use of additional tools. It would also be desirable to have a cover with an attachment system that will maintain the cover on the wheel even if some portions of the attachment system become inoperable.

SUMMARY OF THE INVENTION

The invention described herein includes a cover for a tire and wheel assembly of the type having an axle hub with lug bolts over which a wheel is fitted and lug nuts used to secure the wheel to the hub. The cover includes a sidewall which carries at least one mounting clip. Each clip includes a pair of opposing attachment prongs, which define a space and a tangentially oriented entryway to accommodate a lug nut therebetween. The cover may be rotatively attached and detached from the wheel by mounting the clip about a lug nut.

One object of this invention is to provide a releasable decorative hub cover for secure attachment to a wheel and tire assembly that can be manually attached to and released from the hub without requiring the use of additional tools. Another object of the invention is to provide a decorative hub cover that is easy to mount and remove from the wheel and tire assembly to simplify service of the wheel.

BRIEF DESCRIPTION OF THE DRAWINGS

These and other aspects of the invention will be apparent from the following description, with reference to the accompanying drawings, in which.

DETAILED DESCRIPTION

Figure 1:
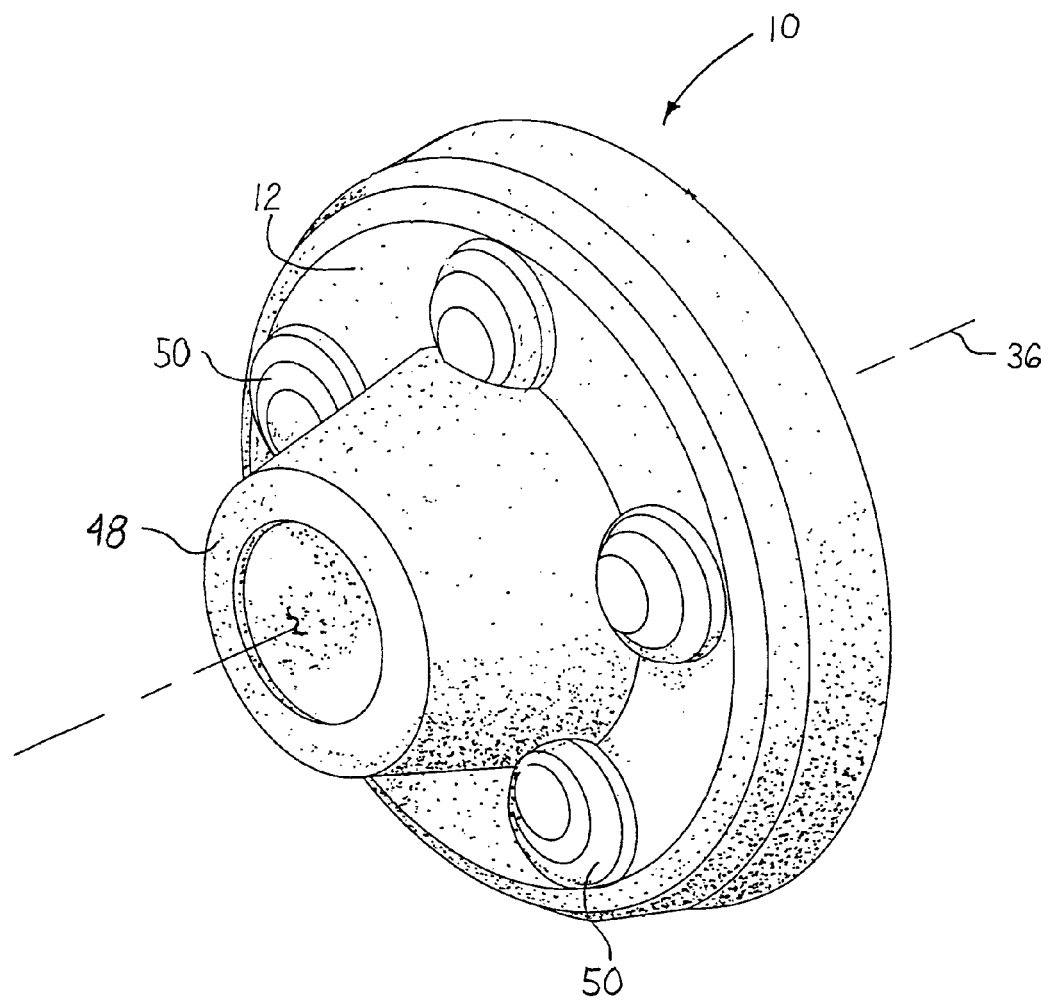
FIG. 1 is a perspective view of the exterior, finished side of the hub cover.
Figure 2:
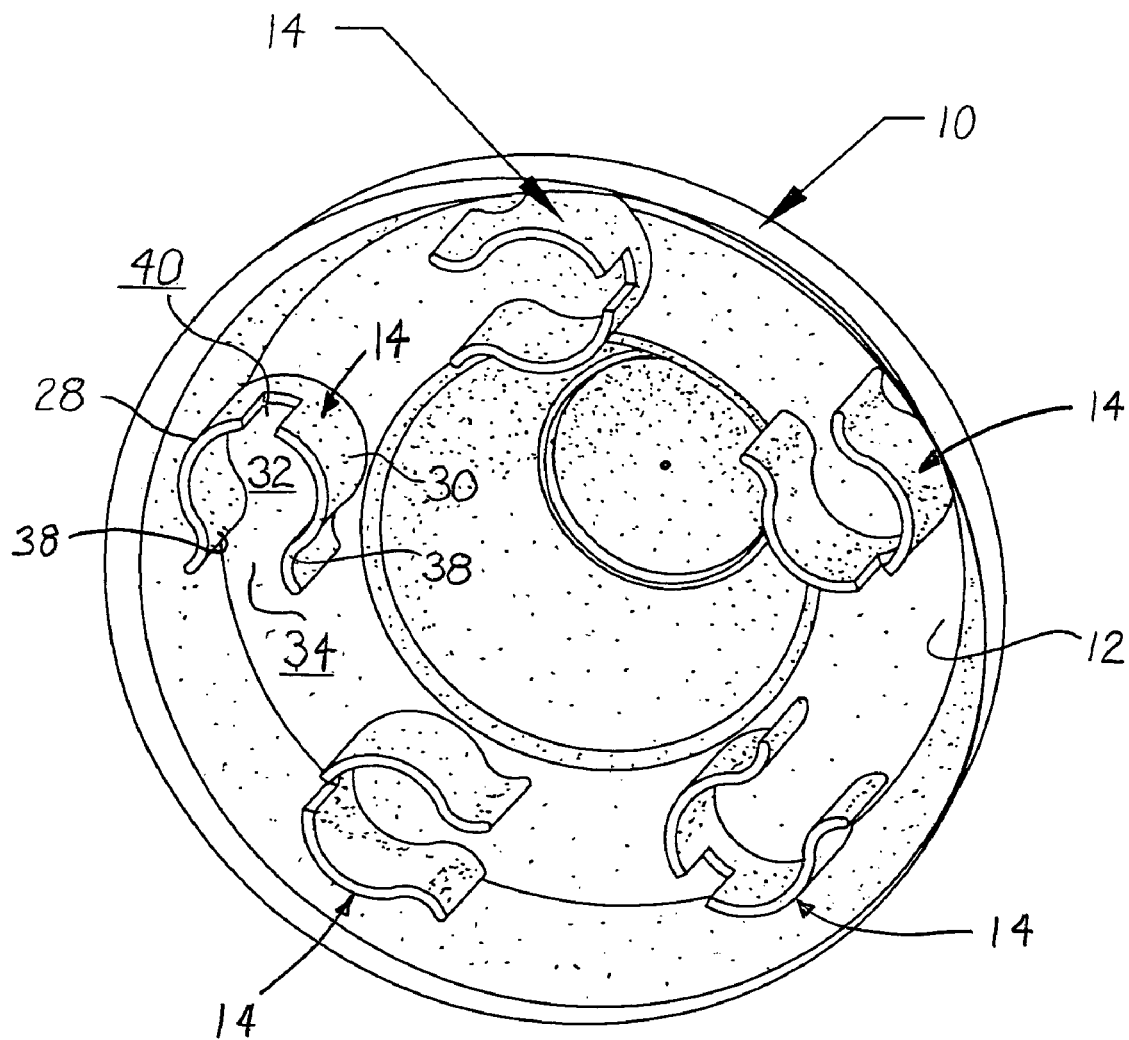
FIG. 2 is a perspective view of the interior, attachment side of the hub cover.
Figure 3:
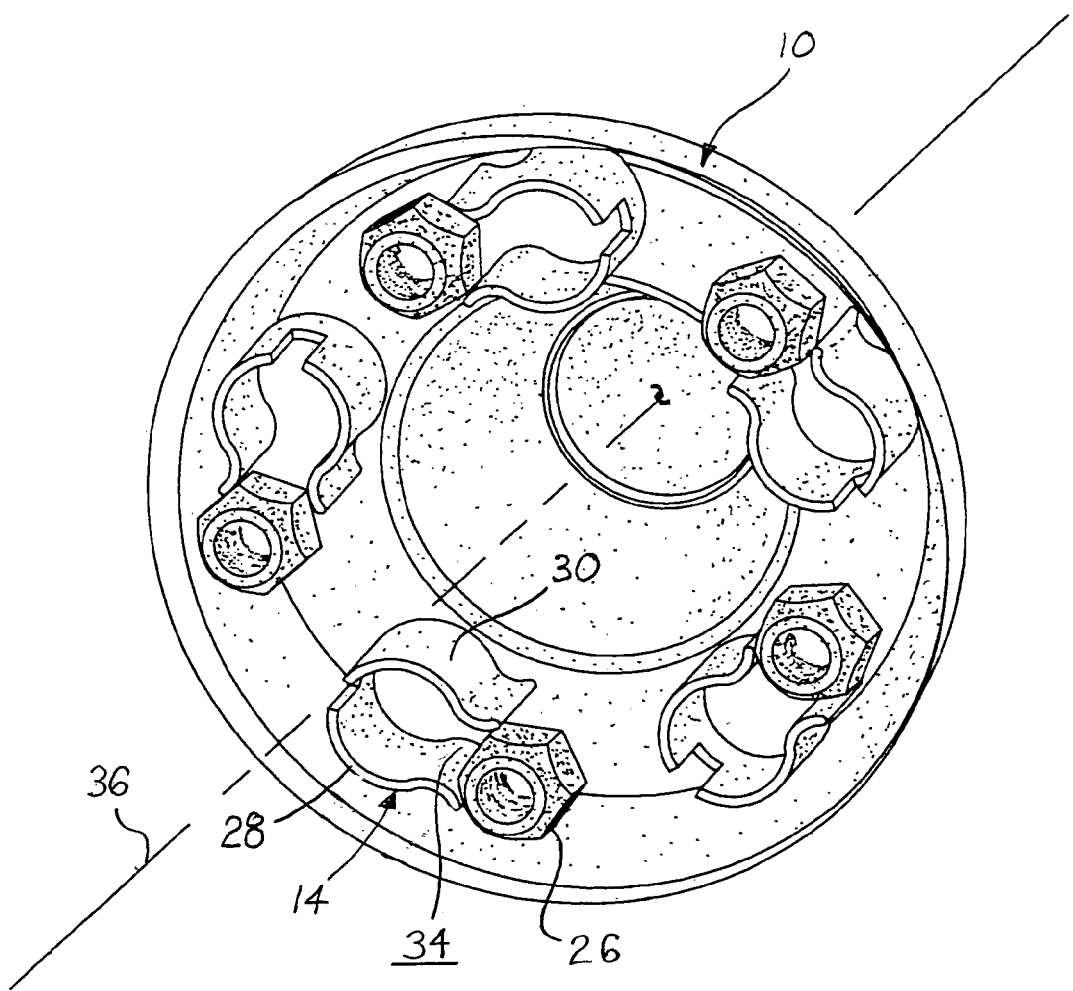
FIG. 3 shows the cover of FIG. 3 as the retention clips are aligned with the lug nuts.
Figure 4:
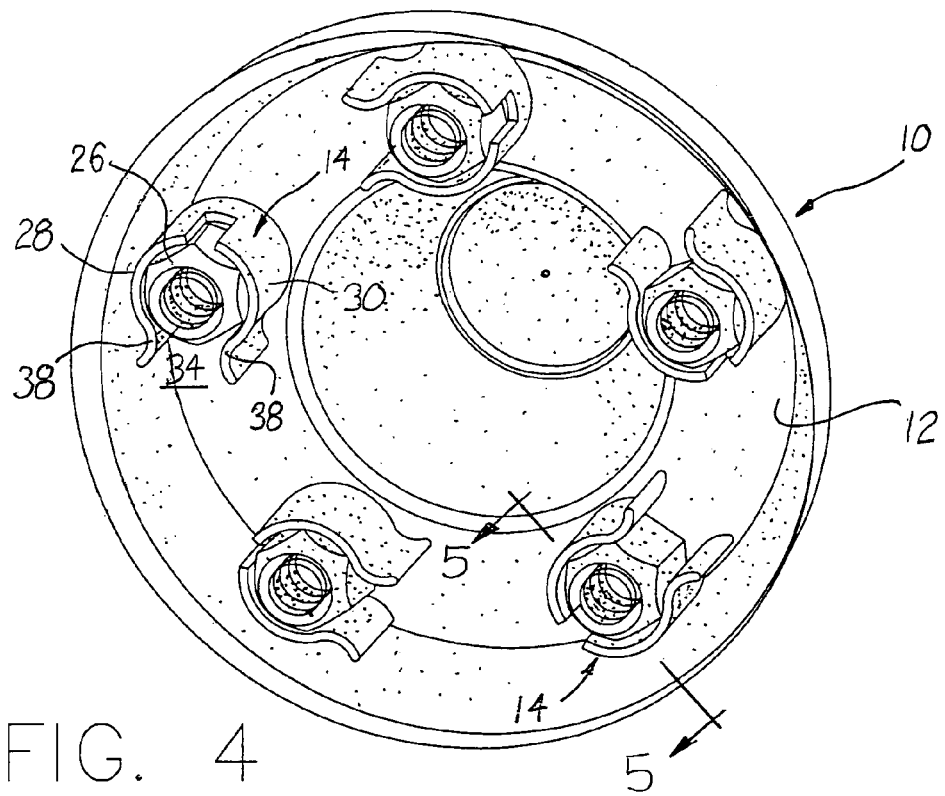
FIG. 4 shows the cover of FIG. 3 with the retention clips fitted about the lug nuts.
Figure 5:
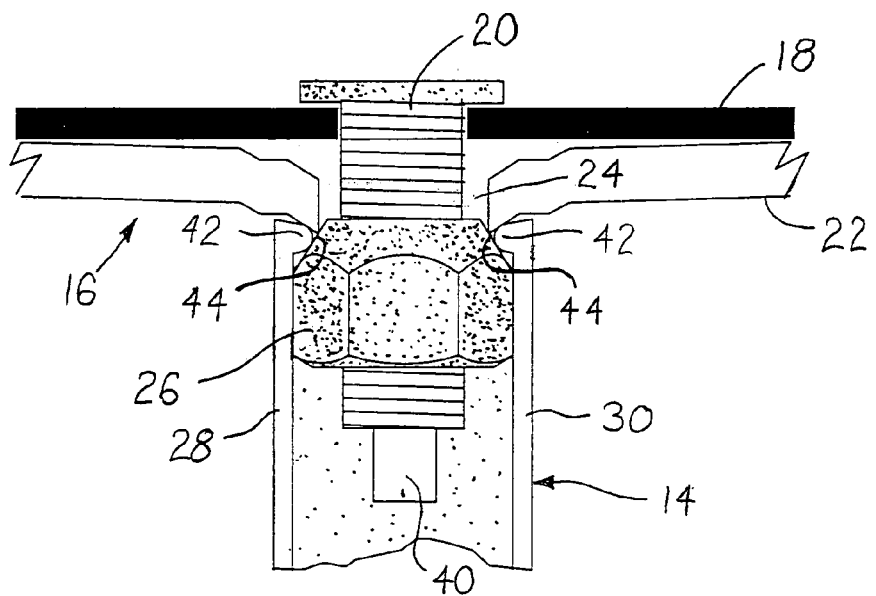
FIG. 5 is a cross-section of a clip mounted to a lug nut on a wheel as seen along the line 5—5 of FIG. 4.

Referring now to the drawings, a decorative hub cover 10 for mounting to a tire and wheel axle assembly 16 is provided. Cover 10 includes a sidewall 12 and a plurality of mounting clips 14 on one side of the sidewall. Axle assembly 16 includes a hub 18 with circumferentially spaced lug bolts 20 protruding from the outer side of the hub. A wheel 22 with bolt holes 24 in its face corresponding to lug bolts 20 is mounted to hub 18 about the bolts and secured thereto with lug nuts 26 threaded onto the protruding ends of the bolts. Cover 10 is mounted to the outer face of wheel 22 with clips 14, which are circumferentially located on sidewall 12 to correspond to the location of bolts 20 such that each clip 14 will fit about a bolt and its associated nut 26.

Each clip 14 includes a pair of opposing sidewalls, or attachment prongs 28, 30 extending outwardly from sidewall 12. Sidewalls 28, 30 are arcuately shaped and radially spaced from each other to form a space 32 therebetween into which a nut 26 fits when cover 10 is mounted to wheel 22. Sidewalls 28, 30 are wide enough to accommodate the entire nut 26 and any protruding portion of bolt 20 without the bolt contacting sidewall 12. A flared entryway 34 is formed between each pair of sidewalls 28, 30 with the entryways being equal radially spaced from the cover's axis 36 and at the same distance from the circumferential centerline 46 of bolts 20 as measured from the center axis 23 of wheel 22. Each entryway 34 is tangentially oriented with respect to the circumferential centerline 46 of bolts 20 such that each entryway opens in the same perpendicular orientation to a radius from the wheel axis 23. Opposed resilient camming surfaces 38 on each sidewall 28, 30 at entryway 34 cause the entryway to be slightly narrower than the width of nut 26. As nut 26 is positioned between sidewalls 28, 30 by passing through entryway 34, camming surfaces 38 are flexed outwardly until the nut is lodged fully within space 32. A notch 40 between sidewalls 28, 30 opposite entryway 34 relieves stress buildup in the sidewalls when camming surfaces 38 are flexed outwardly. A ridge 42 along the distal edges of sidewalls 28, 30 fits into a groove or recess 44 around nut 26 to prevent cover 10 from disengaging axially from wheel 22.

Figure 6:
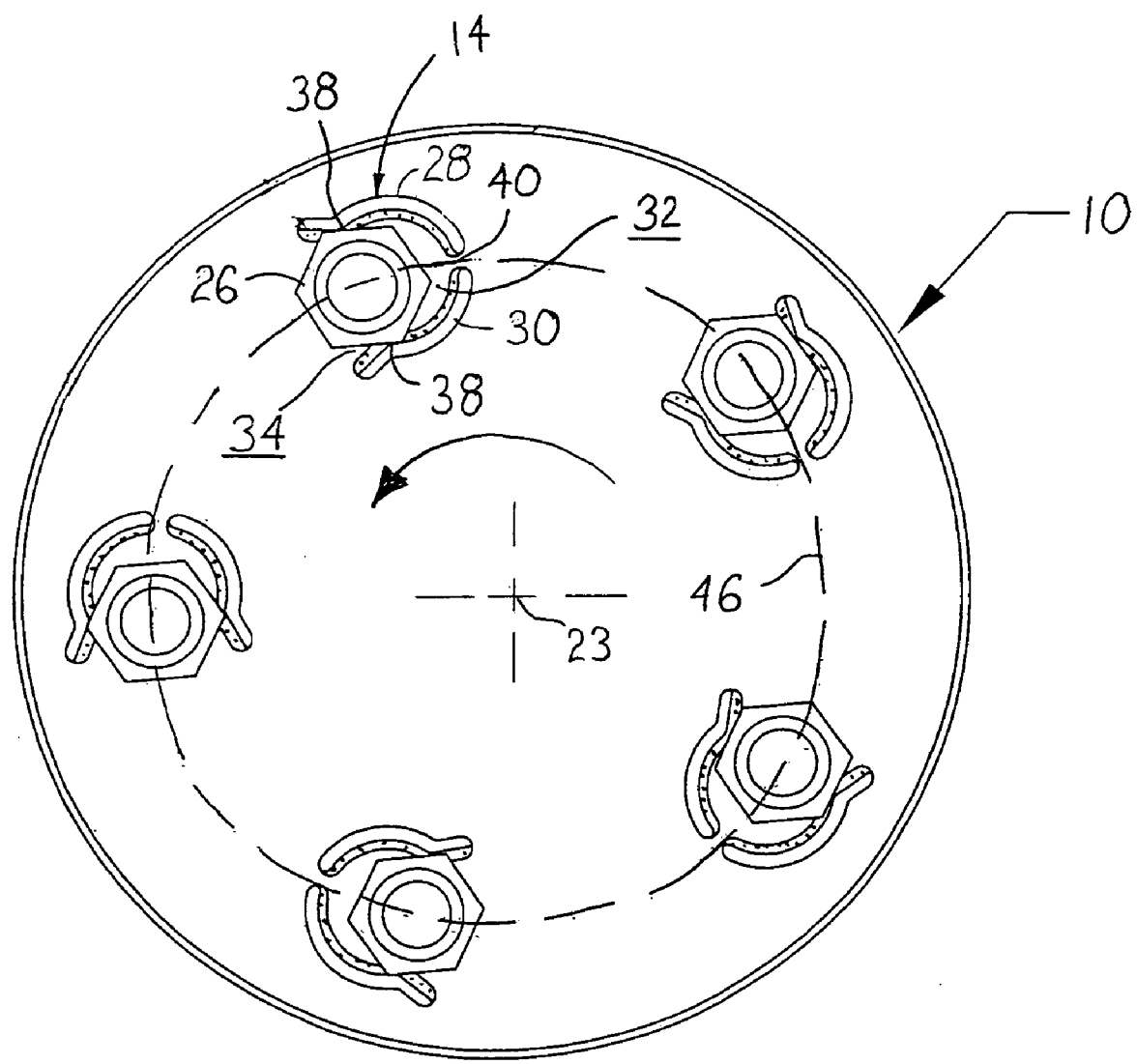
FIG. 6 is a cross-sectional view of the cover of FIG. 3 as seen from the rear at mid-rotational engagement.
Figure 7:
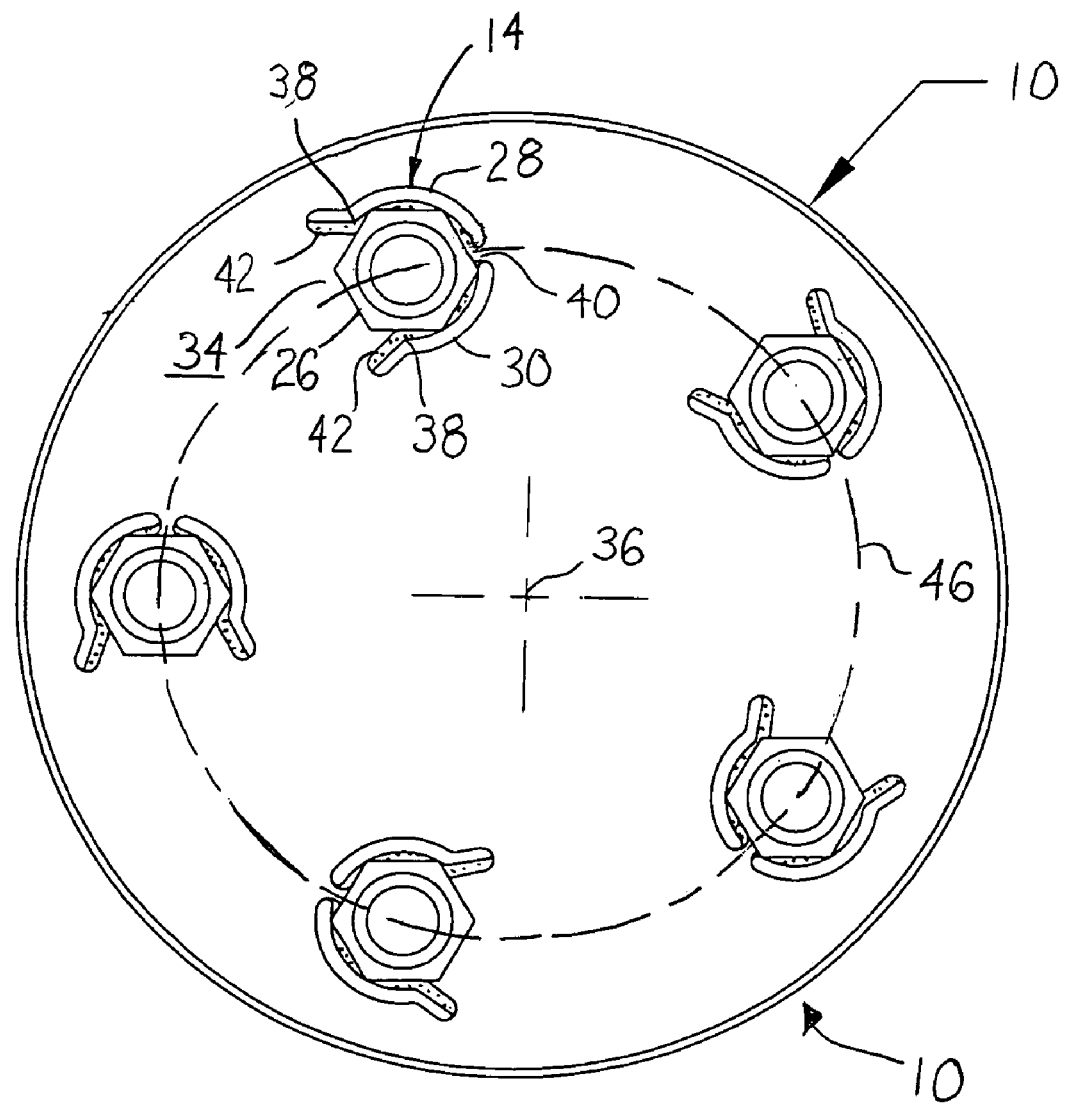
FIG. 7 is a cross-sectional view of the cover of FIG. 4 as seen from the rear at full rotational engagement; and, FIGS. 8A–8G are incremental, sequential axial cross-sectional views of a single clip as it shifts between its position adjacent a lug nut and its position fully secured about the lug nut.

As best depicted in FIGS. 6 and 7, camming surfaces 38 at the end of sidewalls 28, 30 align nuts 26 with entryways 34 as cover 10 is about to be mounted onto the nuts and also guides the nuts into the entryways as the cover is rotated onto the nuts. Ridges 42 on sidewalls 28, 30 also urge the mounting clips 14 against the face of wheel 22. When each nut 26 is fully clamped within space 32 of its receiving sidewalls 28, 30, camming surfaces 38 return to a narrower position, thereby clamping the nut between the sidewalls to prevent cover 10 from unwanted rotative disengagement from the wheel.

Figure 8A:
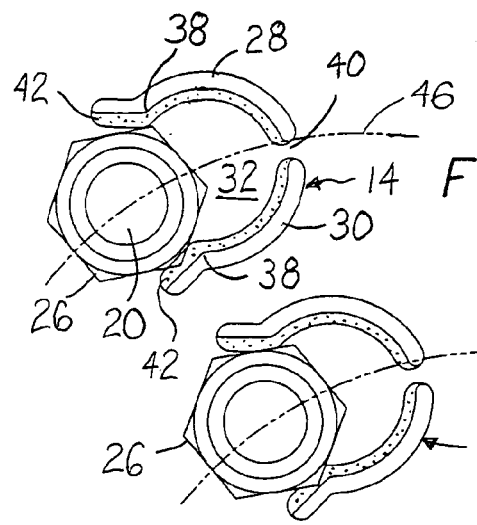
Figure 8B:
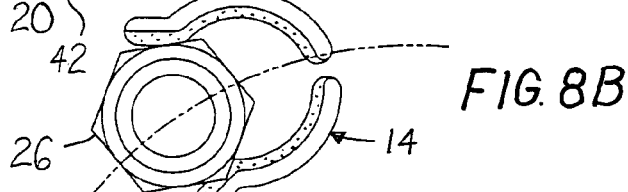
Figure 8C:
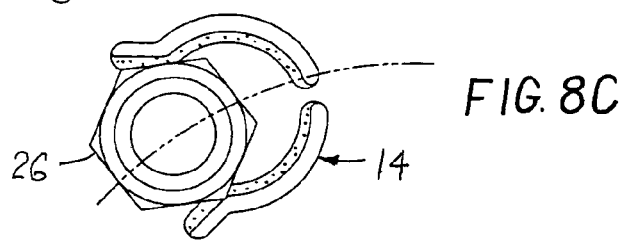
Figure 8D:
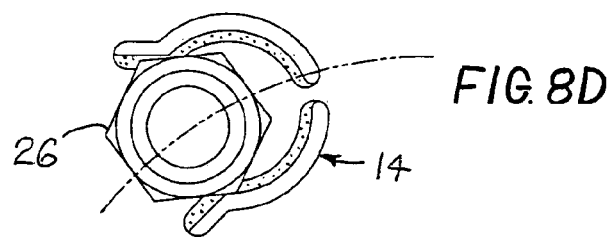
Figure 8E:
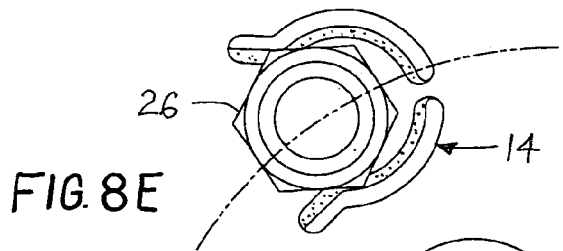
Figure 8F:
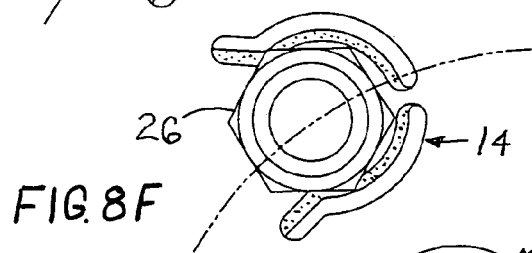
Figure 8G:
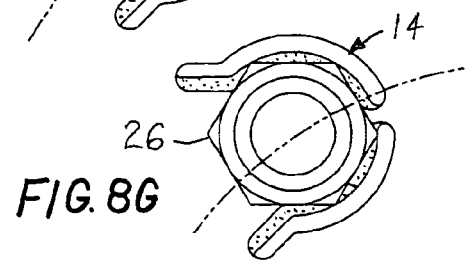

Focusing on FIGS. 8A–8G, the relation of a clip 14 to a nut 26 is shown in sequential steps as the mounting clip is mounted over the nut. In FIG. 8A, camming surfaces 38 of sidewalls 28, 30 are adjacent the nut, aligning mounting clip 14 with the nut along the circumferential centerline 46 of the bolts 20. FIGS. 8B–8F show sequential intermittent positions as cover 10 is rotated about the rotational axis 23 of the wheel 22 and hub 18, shifting clip 14 along bolt centerline 46 toward its mounted position about the nut. Camming surfaces 38 temporarily flex apart to allow nut 26 to pass through entryway 34 into space 32 between sidewalls 28, 30. Ridge 42 of the sidewalls is fitted into the groove 44 between the nut and wheel to secure the cover against the wheel. In FIG. 8G, clip 14 is fully clamped about nut 26 with ridge 42 seated in groove 44 on the nut. The cover 10 can be removed by rotating the cover relative to the wheel in the opposite direction by which it was attached to the wheel.

Cover 10 is preferably made of acrylonitrile-butadiene-styrene—commonly referred to as ABS—in any manner well known in the art. Cover sidewall 12 is geometrically shaped with relief part 48 to accommodate the axle hub so that cover 10 may be mounted as heretofore described. Additional sidewall relief features 50 provide geometric relief in sidewall 12 to accommodate gripping the cover for the clockwise and counter clockwise rotational movement of the cover to attach the clips to and release the clips from the nuts. Features 50 may also be formed to stimulate a pleasurable aesthetic response in a viewer.

The detailed description hereinbefore related is only meant to exemplify the invention to enable those skilled in the art to make and use it. It is not intended to be a limitation from other minor and obvious variations on the embodiments described, all of which variations are expressly included herein.

We claim:

1. A cover for releasable attachment to a wheel over the hub of an axle, said hub including circumferentially spaced lug bolts protruding through said wheel, and a corresponding plurality of lug nuts turned on said bolts against said wheel to maintain the wheel on said hub, each of said nuts defining a circumferential recess with said wheel, said cover comprising;

a sidewall for covering said wheel; and, a mounting clip carried by said sidewall, said mounting clip including a pair of opposed arcuate prongs defining a space therebetween terminating in a restricted entryway means into said space for receiving one of said nuts therein, said cover being mounted and dismounted to said wheel by rotating the cover relative to the wheel to cause a said one nut to pass through said entryway in and out of said space.

2. The cover of claim 1 wherein at least one of said prongs includes a ridge for insertion into said recess about said one nut when the nut is positioned in said space.

3. The cover of claim 2 wherein said mounting clip further includes a resilient camming surface at said entry for frictional engagement with said one nut.

4. The cover of claim 2 and a plurality of said mounting clips corresponding in number and position to each of said bolts, a corresponding ridge on each of said prongs, each said entry oriented in the same tangential direction with said cover being mounted and dismounted from said nuts by rotating said cover relative to said wheel to cause each nut to pass through a corresponding entryway into and out of a corresponding space, and a corresponding ridge of each prong fitted into a corresponding recess about a corresponding nut when the nut is positioned in a corresponding space.

* * * * *